(12) United States Patent
Parks et al.

(10) Patent No.: US 7,690,683 B2
(45) Date of Patent: Apr. 6, 2010

(54) AIRBAG WITH AUTOMATIC VENT CLOSER

(75) Inventors: Brent Parks, Englewood, CO (US); David J. Green, Brigham City, UT (US)

(73) Assignee: Autoliv ASP, Inc., Ogden, UT (US)

( * ) Notice: Subject to any disclaimer, the term of this patent is extended or adjusted under 35 U.S.C. 154(b) by 191 days.

(21) Appl. No.: 11/728,688

(22) Filed: Mar. 26, 2007

(65) Prior Publication Data

US 2008/0238062 A1 Oct. 2, 2008

(51) Int. Cl.
*B60R 21/16* (2006.01)
*B60R 21/239* (2006.01)

(52) U.S. Cl. .................................. 280/743.2; 280/739

(58) Field of Classification Search ................ 280/739, 280/743.2
See application file for complete search history.

(56) References Cited

U.S. PATENT DOCUMENTS

| | | | | |
|---|---|---|---|---|
| 4,453,292 | A * | 6/1984 | Bakker ...................... | 24/115 G |
| 6,454,300 | B1 * | 9/2002 | Dunkle et al. ............... | 280/742 |
| 6,832,778 | B2 * | 12/2004 | Pinsenschaum et al. ..... | 280/739 |
| 6,932,385 | B2 * | 8/2005 | Hawthorn et al. ........... | 280/739 |
| 2003/0034637 | A1 | 2/2003 | Wang et al. | |
| 2004/0012179 | A1 | 1/2004 | Pinsenschaum et al. ..... | 280/739 |
| 2004/0012180 | A1 * | 1/2004 | Hawthorn et al. ........... | 280/739 |
| 2004/0051285 | A1 * | 3/2004 | Fischer ...................... | 280/739 |
| 2004/0112239 | A1 * | 6/2004 | Parks et al. ................. | 102/202 |
| 2004/0164526 | A1 | 8/2004 | Hasebe et al. | |
| 2004/0232677 | A1 * | 11/2004 | Fischer et al. ............... | 280/739 |
| 2005/0104347 | A1 | 5/2005 | Hawthorn et al. | |
| 2005/0127648 | A1 * | 6/2005 | Fischer et al. ............... | 280/739 |
| 2005/0146122 | A1 * | 7/2005 | Gould et al. ................ | 280/739 |
| 2005/0212273 | A1 | 9/2005 | Thomas et al. .............. | 280/739 |
| 2005/0225065 | A1 * | 10/2005 | Fujll ........................ | 280/743.2 |
| 2005/0248137 | A1 * | 11/2005 | Delventhal et al. .......... | 280/739 |
| 2006/0071462 | A1 | 4/2006 | Smith et al. | |
| 2006/0151975 | A1 * | 7/2006 | Yamaji et al. ............. | 280/728.2 |
| 2006/0170202 | A1 * | 8/2006 | Block et al. ............... | 280/743.2 |
| 2006/0284404 | A1 | 12/2006 | Green et al. | |
| 2006/0290117 | A1 * | 12/2006 | Fischer et al. ............... | 280/739 |

(Continued)

OTHER PUBLICATIONS

Notification of Transmittal of the International Search Report and the Written Opinion of the International Searching Authority issued Jul. 31, 2008 in International Application No. PCT/US2008/052266.

*Primary Examiner*—Paul N. Dickson
*Assistant Examiner*—Barry Gooden, Jr.
(74) *Attorney, Agent, or Firm*—Sally J Brown; Stoel Rives LLP

(57) ABSTRACT

Disclosed are embodiments of apparatus, methods, and systems for automatically closing a vent opening in response to inflation of an airbag cushion. In some embodiments, primary and secondary tethers are provided, both of which are coupled to an airbag cushion. The primary tether may be used to restrain the inflation size of the airbag cushion during a partial deployment. A tether cutter may also be provided to cut the primary tether upon detecting a condition that would warrant full deployment of the airbag cushion. The secondary tether may be configured to at least partially close one or more vent openings in response to the airbag cushion being inflated to a fully-inflated configuration after the primary tether has been cut.

16 Claims, 8 Drawing Sheets

U.S. PATENT DOCUMENTS

| | | |
|---|---|---|
| 2007/0029762 A1* | 2/2007 | Katsuda et al. .......... 280/728.2 |
| 2007/0040366 A1* | 2/2007 | Maidel et al. ............... 280/739 |
| 2007/0108750 A1* | 5/2007 | Bauer et al. ................. 280/740 |
| 2007/0170709 A1* | 7/2007 | Braun et al. ................. 280/739 |
| 2007/0194561 A1* | 8/2007 | Thomas ................... 280/728.2 |
| 2007/0205590 A1* | 9/2007 | Klinkenberger et al. .. 280/743.2 |
| 2007/0216146 A1* | 9/2007 | Williams et al. ............ 280/739 |
| 2007/0252370 A1* | 11/2007 | Thomas ...................... 280/742 |
| 2008/0036188 A1* | 2/2008 | Gould et al. ................. 280/739 |
| 2008/0238050 A1* | 10/2008 | Green et al. ............. 280/728.3 |
| 2009/0039630 A1* | 2/2009 | Schneider et al. ........... 280/740 |

* cited by examiner

AIRBAG WITH AUTOMATIC VENT CLOSER

TECHNICAL FIELD

The present invention relates generally to the field of automotive protective systems. More specifically, the present invention relates to airbag modules for automatically closing a vent opening in response to inflation of an airbag cushion.

BRIEF DESCRIPTION OF THE DRAWINGS

Understanding that drawings depict only typical embodiments of the invention and are not therefore to be considered to be limiting of its scope, the invention will be described and explained with additional specificity and detail through the use of the accompanying drawings in which.

DETAILED DESCRIPTION OF PREFERRED EMBODIMENTS

Figure 1:
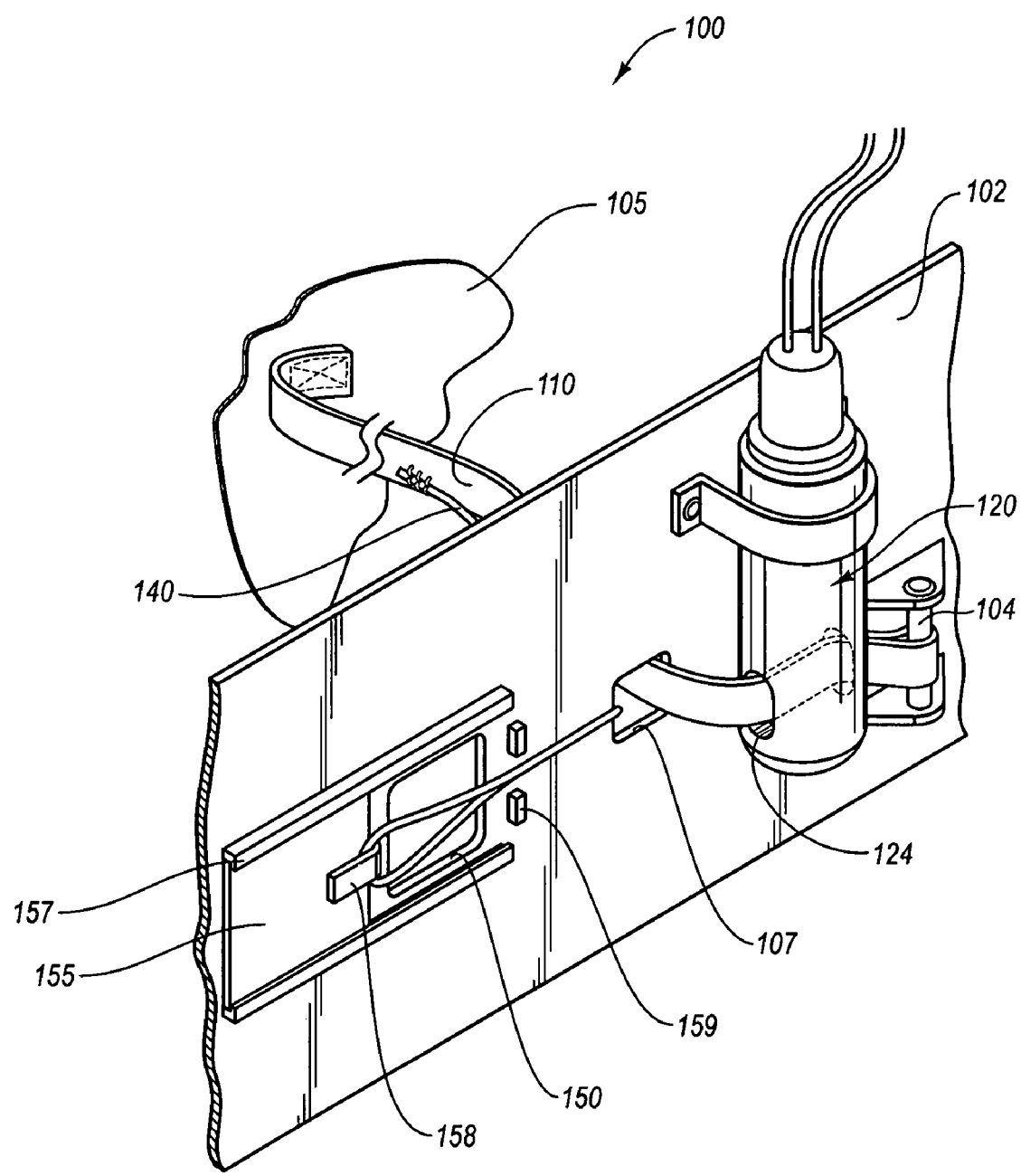
FIG. 1 is a cut-away view of an airbag module according to one embodiment of the invention shown prior to deployment.

Described below are embodiments of apparatus, methods, and systems for automatically closing a vent opening in response to inflation of an airbag cushion. In the following description, numerous specific details are provided for a thorough understanding of the embodiments of the invention. However, those skilled in the art will recognize that the invention can be practiced without one or more of the specific details, or with other methods, components, materials, etc.

In addition, in some cases, well-known structures, materials, or operations are not shown or described in detail in order to avoid obscuring aspects of the invention. Furthermore, the described features, structures, or characteristics may be combined in any suitable manner in one or more embodiments.

In one embodiment of the invention, an airbag module is provided. The airbag module may comprise a housing having at least one vent opening formed therein. An airbag cushion may be positioned within the housing and configured to inflate adjacent a vehicle occupant. Primary and secondary tethers may be provided. The primary tether may be connected with the airbag cushion to restrain the inflation size of the airbag cushion. This may be useful for partial airbag deployments, such as deployments for an "out of position occupant." The primary tether may be connected at its opposite end to the outside of the module housing. A tether cutter may also be provided to cut the primary tether upon detecting a condition that would warrant full deployment of the airbag cushion. Once the primary tether has been cut, the airbag cushion is no longer restrained and may be fully inflated.

In some embodiments, the tether cutter may actuated with an initiator. The initiator may be configured such that it provides an inherent seal to prevent the external release of pyrotechnic residues upon deployment. In some embodiments, this feature may be provided by using an initiator that has a redrawn end that unrolls and expands during deployment. Examples of suitable tether cutters, including tether cutters with inherent seals and redrawn ends, as described above, can be found in U.S. patent application Ser. No. 11/154,126 filed Jun. 16, 2005 and titled "AIRBAG TETHER RELEASE MECHANISM," which is hereby incorporated by reference in its entirety.

The secondary tether may also be connected with the airbag cushion. The secondary tether may, for example, be connected with the airbag cushion by being attached to the primary tether, which is, in turn, attached to the airbag cushion. Alternatively, the secondary tether may itself be attached directly to the airbag cushion. The secondary tether may be configured for at least partially closing one or more vent openings. More specifically, the secondary tether may be configured to at least partially close the vent opening(s) in response to the airbag cushion being inflated to a fully-inflated configuration following release of the primary tether. Thus, the energy associated with the inflation of the airbag cushion may be used to cause the secondary tether to close the vent opening(s). In some embodiments, the secondary tether may therefore be connected, at the end opposite from the end connected with the airbag cushion, to a vent door. Upon full inflation of the airbag cushion, the vent door may be pulled closed by the secondary tether.

With reference to the accompanying figures, particular embodiments of the invention will now be described in greater detail. Airbag module 100 includes a housing 102. Within housing 102, an airbag cushion 105 may be stored. A primary tether 110 is connected with airbag cushion 105 for restraining the inflation size of the airbag cushion. Primary tether 110 extends through an opening 107 in the module housing 102 and through an opening 124 in a tether cutter 120.

Figure 2:
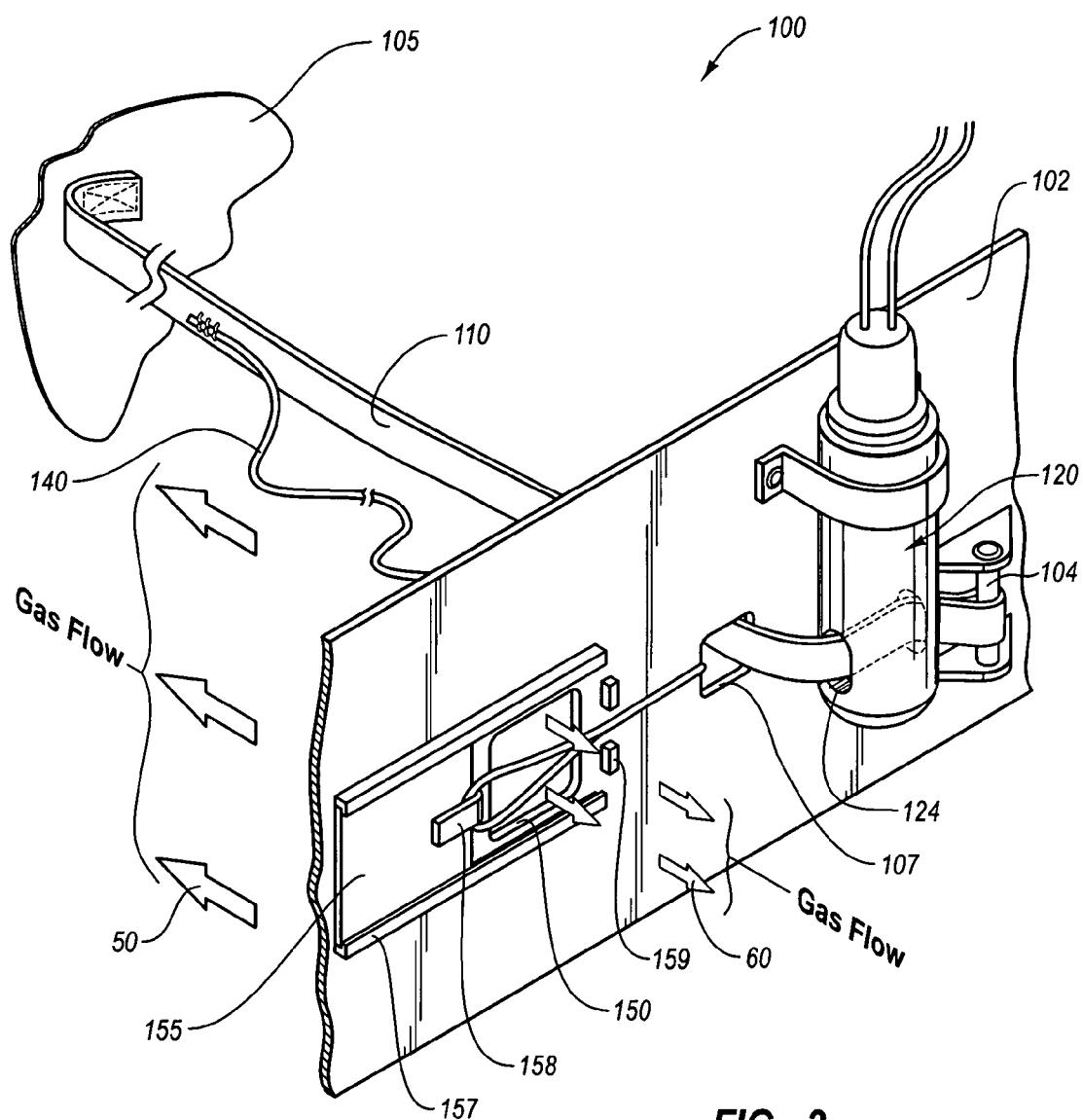
FIG. 2 is a cut-away view of the embodiment of FIG. 1 shown during a partial deployment configuration.
Figure 3:
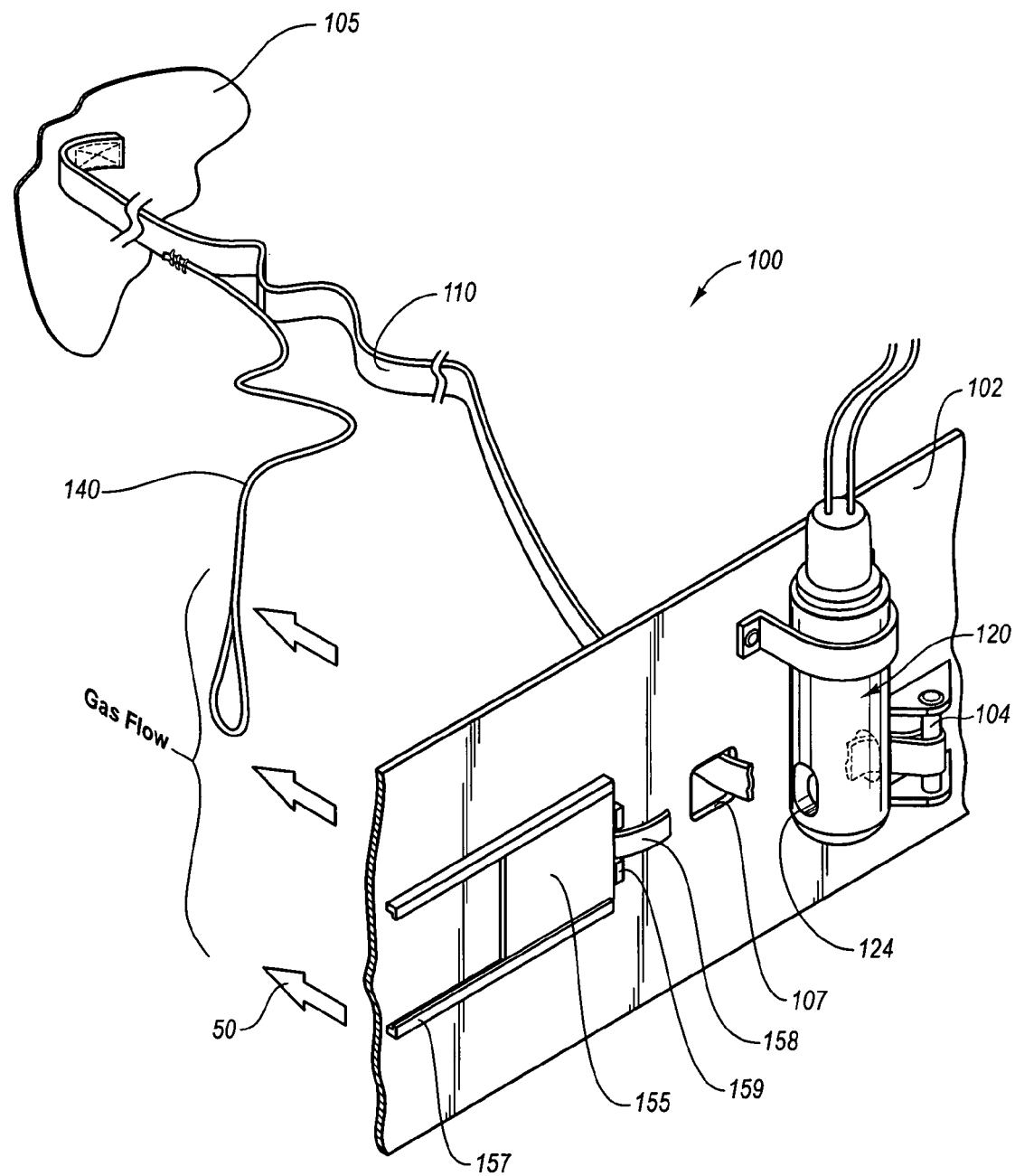
FIG. 3 is a cut-away view of the embodiment of FIGS. 1 and 2 shown during a full deployment configuration.
Figure 4:
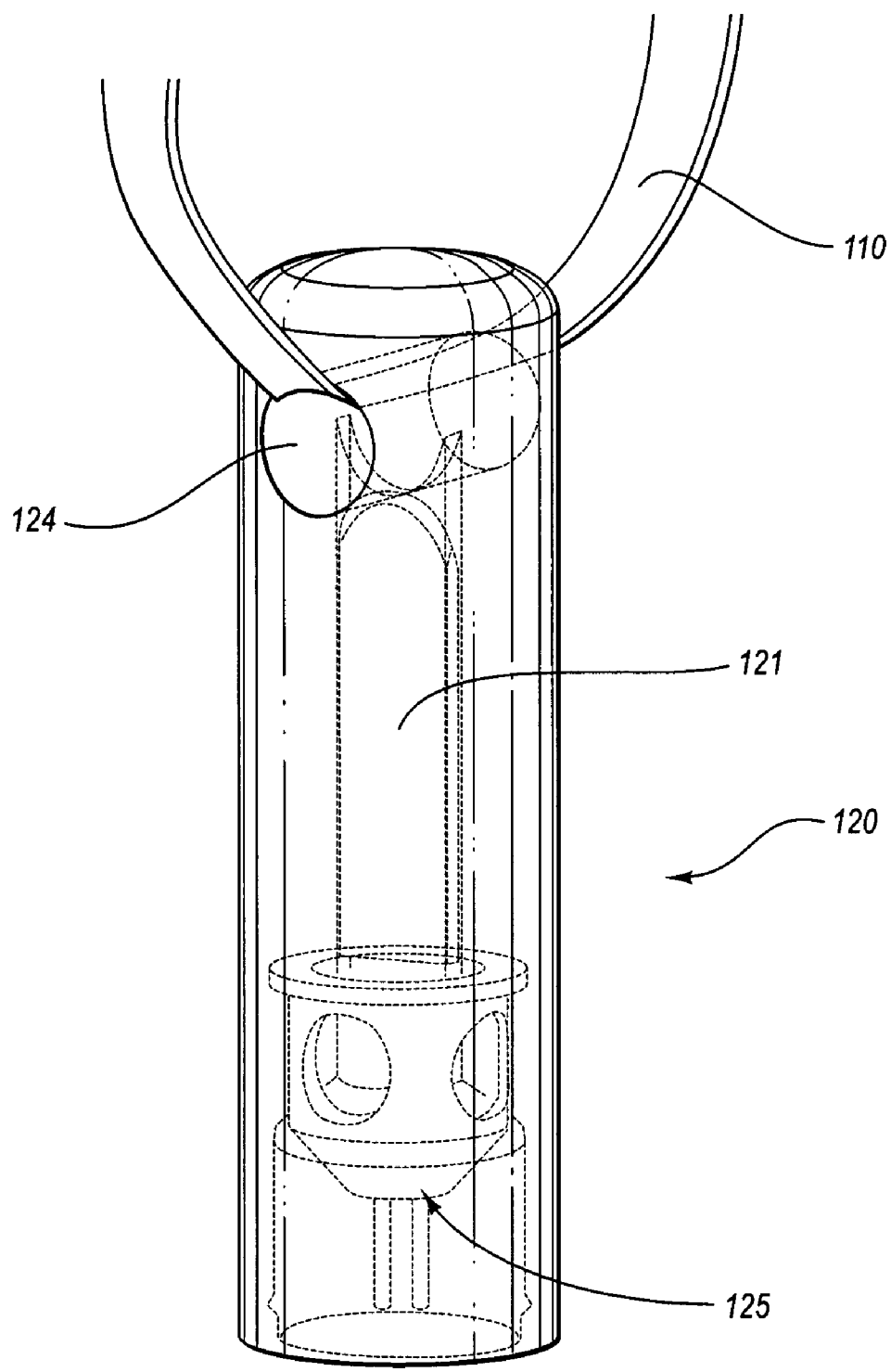
FIG. 4 is a perspective transparency view of one embodiment of a tether cutter usable with various embodiments of the invention.
Figure 5A:
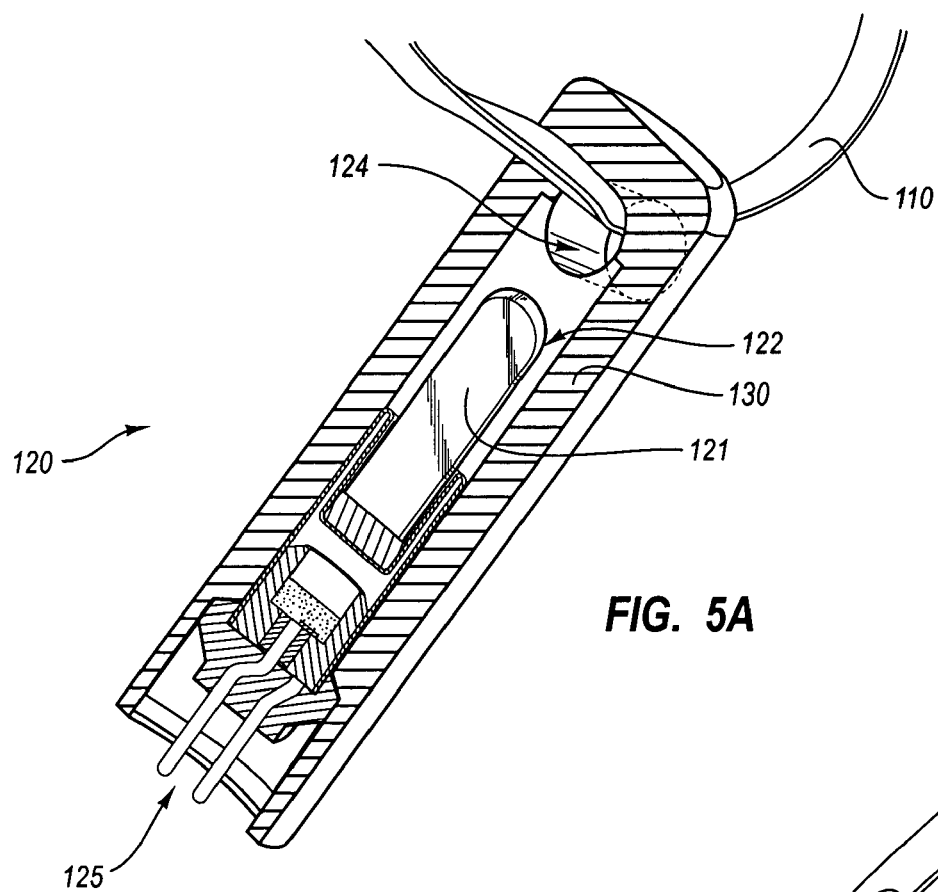
FIG. 5A is a cross-sectional view of the tether cutter shown in FIG. 4.
Figure 5B:
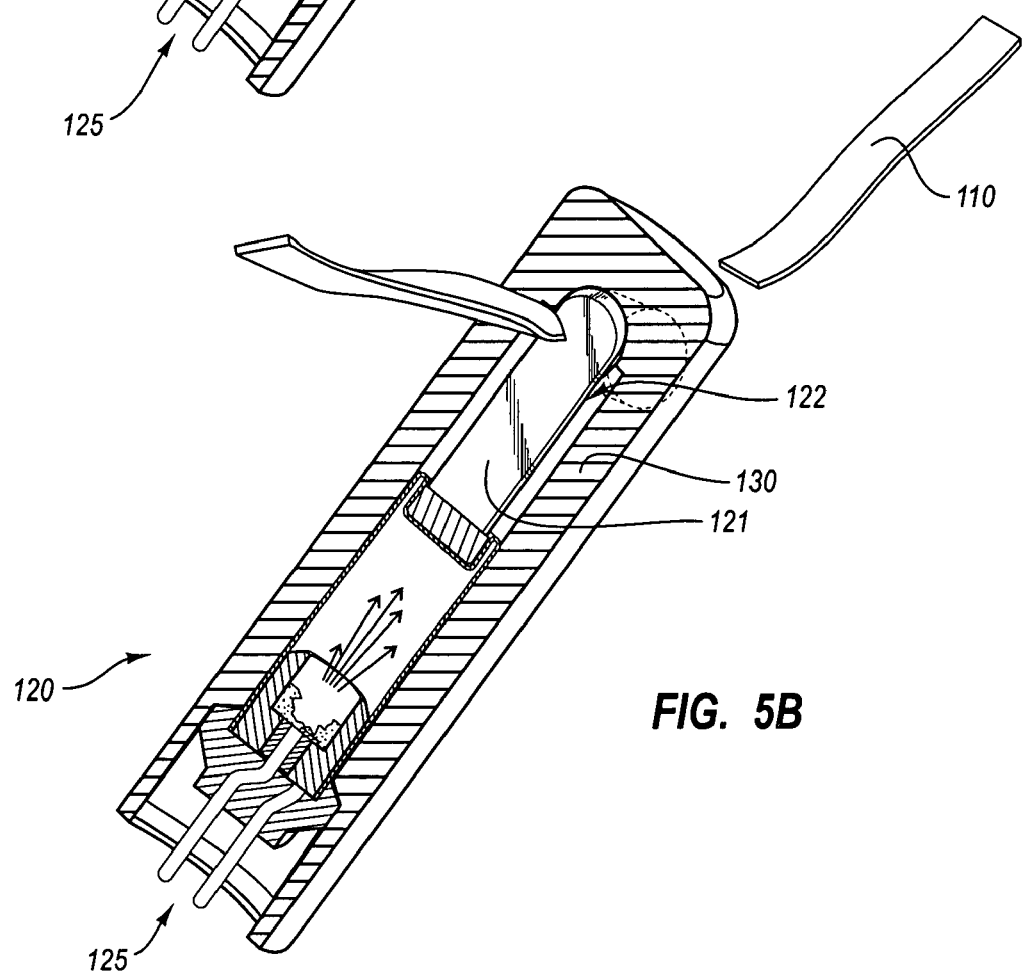
FIG. 5B is a cross-sectional view of the tether cutter shown in FIGS. 4 and 5A shown after the cutter has cut through and released a primary tether.

In the embodiment depicted in FIGS. 1-3, tether cutter 120 includes an initiator 125. Tether cutter 120 and its accompanying initiator 125 are best seen in FIGS. 4, 5A, and 5B. Initiator 125 may be configured such that it is non-flashing and non-propulsive. In other words, initiator 125 does not emit a flash and has no loose parts (parts that leave the device other than a tether or similar released articles—e.g., a bolt). Initiator 125 may be provided with an inherent seal to prevent the external (external to the initiator) release of pyrotechnic residues upon deployment. Thus, in this embodiment, an o-ring need not be used in order to seal the initiator in the housing and prevent propulsion and flashing. This may also be useful for some applications because it may allow the device to be classified in a less restrictive hazard category. As one having ordinary skill in the art will appreciate, initiator 125 may be activated pyrotechnically or otherwise.

Initiator 125 obtains its aforementioned inherent seal by virtue of having an output cup with a redrawn end. In other words, the end of initiator 125 is rolled back inside itself, "unrolls", and extends during deployment, thereby providing the force necessary to actuate the cutters described herein. Such "redrawn" initiators have been disclosed and described in greater detail in copending U.S. patent application Ser. No. 10/729,702 filed Dec. 5, 2003 and titled "Assemblies including extendable, reactive charge-containing actuator devices." Other embodiments of such initiators have been disclosed and described in greater detail in copending U.S. patent application Ser. No. 11/154,194 filed on Jun. 16, 2005 and titled "Assemblies including extendable, reactive charge-containing actuator devices." The disclosures of these two applications are hereby incorporated by reference in their entireties.

Tether cutter 120 includes a cutting blade 121 that is operatively connected with the initiator 125. This allows deployment of initiator 125 to actuate the cutter 120, as described below. Cutting blade 121 is slidable within a slot 122 formed in tether cutter housing 130, as best seen in FIGS. 5A and 5B. Cutting blade 121 is configured and positioned such that it may be moved from a position adjacent to opening 124, as shown in FIG. 5A, to a position at which it is at least partially coincident with opening 124, as shown in FIG. 5B. Once initiator 125 has been deployed, cutting blade 121 is actuated or moved axially within housing 130 such that it extends into opening 124, thereby allowing cutting blade 121 to cut through primary tether 110.

In some embodiments, cutting blade 121 may be positioned within cutter slot 122 such that it is only slidable after a threshold amount of force has been applied. For example, blade 121 may be tightly positioned within cutter slot 122 such that a threshold amount of friction must be overcome before it can be slid up to opening 124. In this manner, unintentional repositioning of blade 121 can be prevented or at least minimized. It may be desirable in some embodiments to configure the device such that a level of force just under that provided by the initiator 125 is required to move cutting blade 121.

As shown in the figures, one end of primary tether 110 is attached to the interior of the airbag cushion 105. The opposite end of primary tether 110 is attached to the exterior of airbag module housing 102 via attachment bar 104. As can be seen in FIG. 1, primary tether 110 is wrapped around attachment bar and is attached to itself to form a closed loop. Of course, countless variations will be apparent to those of ordinary skill in the art. For example, a closed loop need not be formed. Instead, the primary tether could be sewn, stapled, or otherwise attached to the module housing, or to another structure coupled with the module housing.

Airbag module 100 also includes a secondary tether 140. Secondary tether 140 is also connected with the airbag cushion 105 and is configured to at least partially close at least one vent opening 150. More particularly, secondary tether 140 is configured to at least partially close the vent opening 150 in response to airbag cushion 105 being inflated to a fully-inflated configuration after primary tether 110 has been cut. Secondary tether 140 is configured to close vent opening 150 by pulling a vent door 155, which is positioned adjacent to vent opening 150, closed.

In the embodiment of FIGS. 1-3, secondary tether 140 is attached directly to main tether 110, which is, in turn, attached to airbag cushion 105. Secondary tether 140 is therefore indirectly connected with airbag cushion 105. The opposite end of secondary tether 140 is connected with vent door 155.

Vent door 155 is a sliding vent door which is connected to a sliding track 157. Sliding vent door 155 comprises an engagement member 158 configured to retain secondary tether 140. Engagement member 158 comprises a hook. Secondary tether 140 is looped around hook 158 at one of its ends to retain secondary tether 140 to door 155. Hook 158 is also deformable. Accordingly, once sufficient force has been applied to secondary tether 140, hook 158 can be bent to release the secondary tether 140 after the sliding vent door 155 has been closed. Examples of materials having suitable properties for this purpose include plastic, steel, aluminum, brass, etc.

Of course, it should be understood that a variety of alternatives are contemplated. For example, in some embodiments, the engagement member could be frangible instead of deformable. In other embodiments, the engagement member need not be configured to release the secondary tether at all. Still other embodiments need not even include an engagement member. For example, the secondary tether could be permanently affixed to the vent door. In addition, the secondary tether need not be attached to the primary tether. Instead, the secondary tether could be attached directly to the airbag cushion.

FIG. 1 illustrates airbag module 100 in a pre-deployment configuration. In this configuration, as shown in the figure, vent door 155 is open, secondary tether 140 is connected to hook 158, and cutter 120, along with the airbag inflator (not shown), have not yet been deployed.

FIG. 2 illustrates airbag module 100 in a first deployment configuration. In this configuration, gas flow 50 is shown inflating airbag cushion 105. As can also be seen in FIG. 2, primary tether 110 restrains airbag cushion 105, such that it cannot fully inflate. Excess gas that would otherwise be used to fully inflate airbag cushion 105 can exit through opening 150 as indicated by arrows 60. In addition, secondary tether 140 has a length sufficient to allow it to remain connected with door 155 in this configuration. The configuration shown in FIG. 2 may correspond with a partial deployment used, for example, when certain conditions, such as the presence of an out-of-position (OOP) occupant in an adjacent seat, are met.

FIG. 3 illustrates airbag module 100 in a full-deployment configuration. In this configuration, tether cutter 120 has been deployed to cut primary tether 110. As such, gas flow 50 is able to fully-inflate airbag cushion 105. Due to inflation of airbag cushion 105 past the position at which primary tether 110 would have otherwise restrained it, secondary tether 140 has pulled sliding vent door 155 to a closed position to block gas flow from exiting vent opening 150. One or more door stops 159 may be provided to limit the distance with which vent door 155 may slide. In addition, secondary tether has been pulled off of engagement member 158 in FIG. 3. In the depicted embodiment, the deployment force has resulted in a deformation of engagement member 158 to allow secondary tether 140 to slide off of and be disengaged from engagement member 158.

Figure 6:
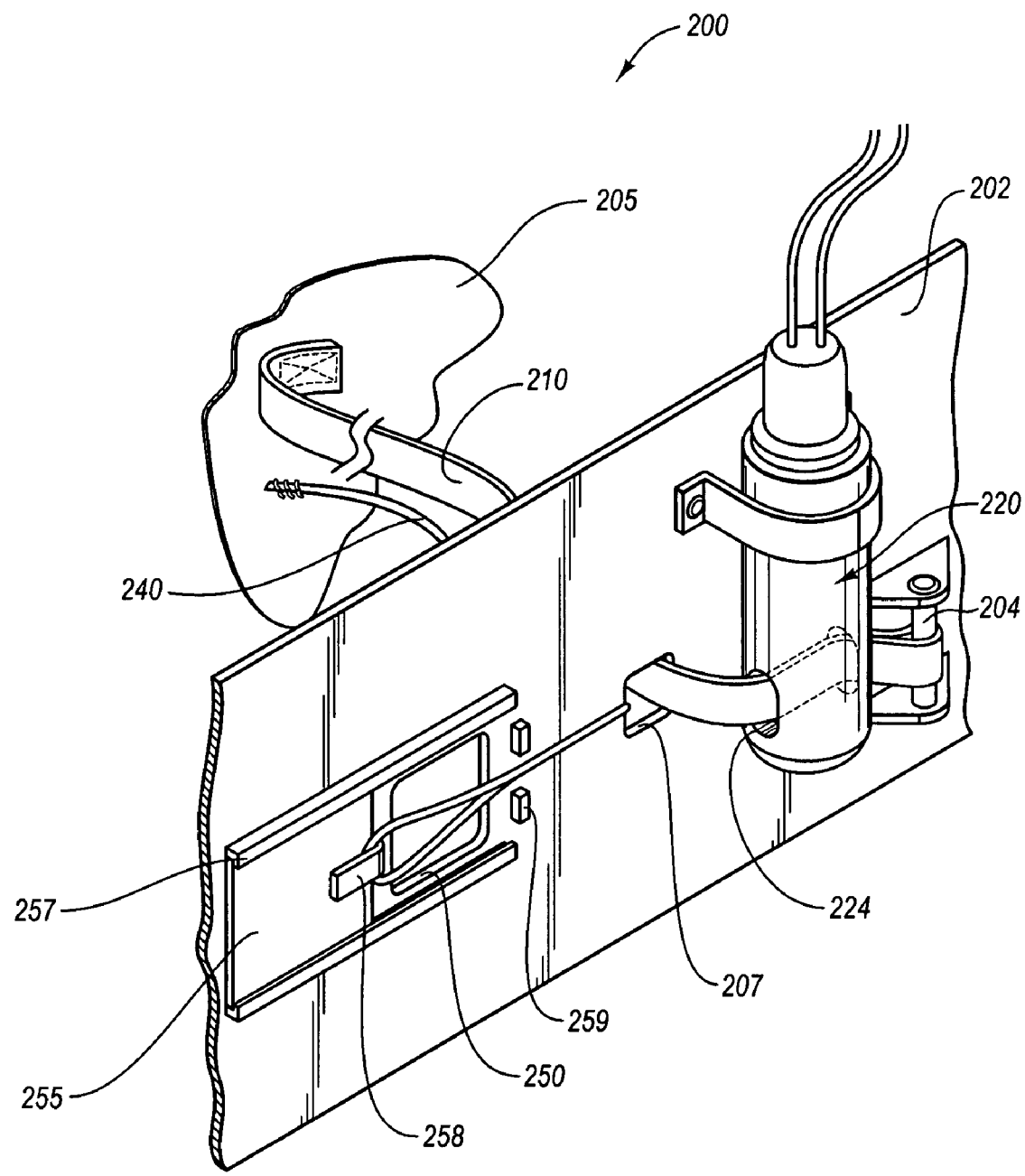
FIG. 6 is cut-away view of an airbag module according to a second embodiment of the invention shown prior to deployment.
Figure 7:
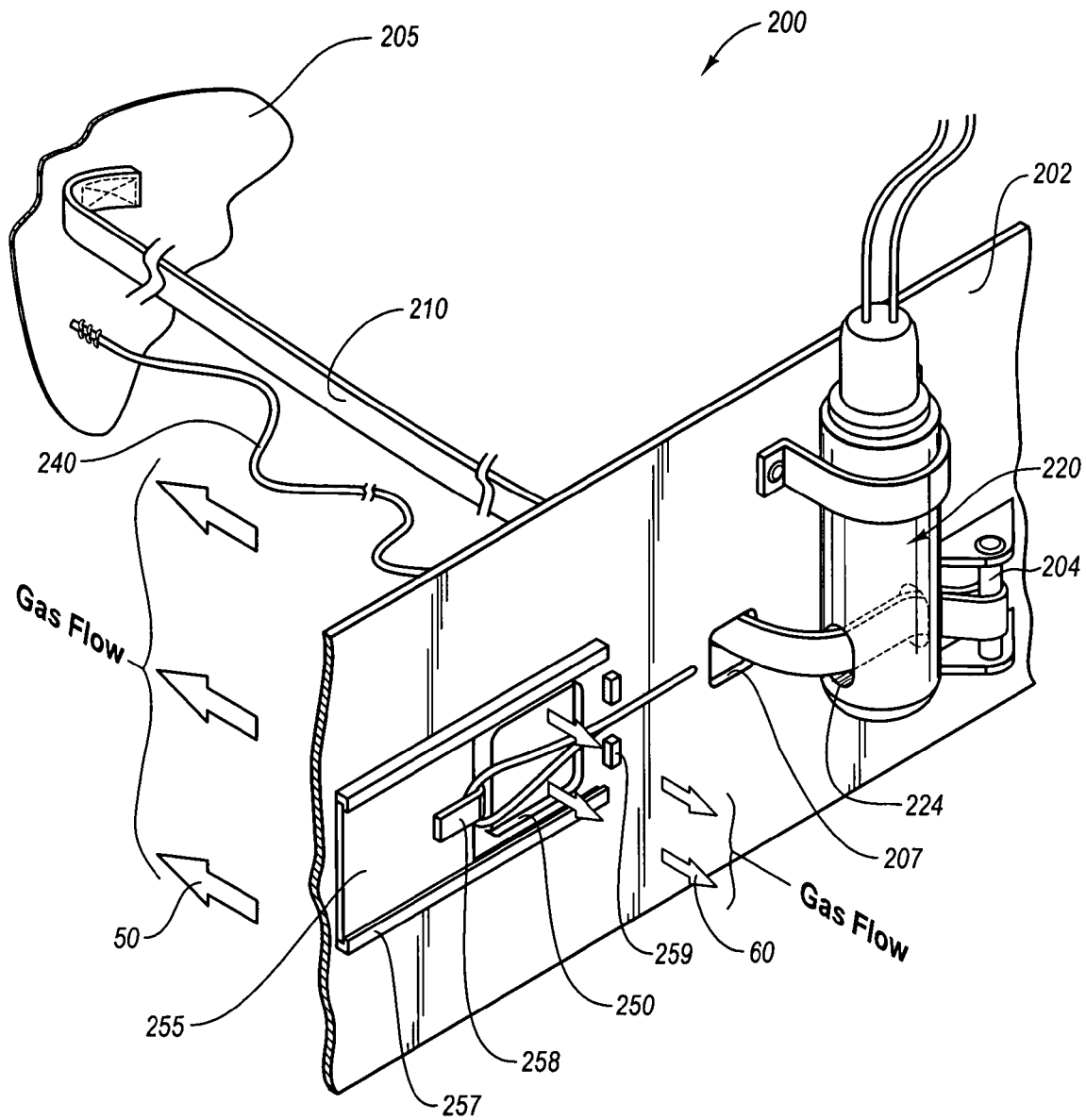
FIG. 7 is a cut-away view of the embodiment of FIG. 6 shown during a partial deployment configuration.
Figure 8:
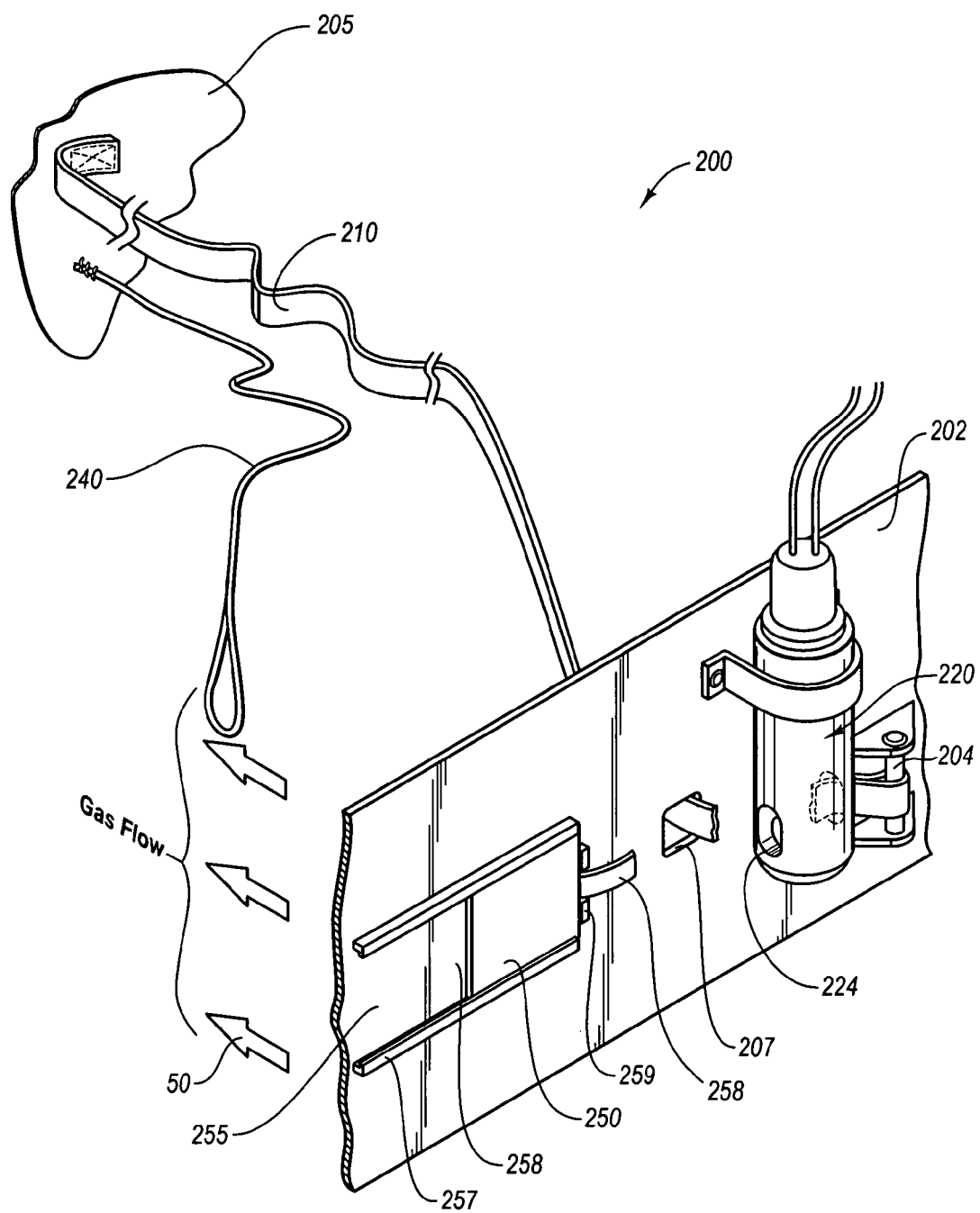
FIG. 8 is a cut-away view of the embodiment of FIGS. 6 and 7 shown during a full deployment configuration.

FIGS. 6-8 illustrate an alternative embodiment of an airbag module 200. Airbag module 200 is similar to airbag module 100. However, secondary tether 240 is attached directly to the interior of airbag cushion 205, rather than to primary tether 210. In this embodiment, secondary tether 240 is attached to airbag cushion 205 near the location at which primary tether 210 is attached to airbag cushion 205, although this need not always be the case. The location of attachment for secondary tether 240 may vary according to the size, shape, location, and other characteristics of the airbag cushion and airbag module, as would be appreciated by those of ordinary skill in the art.

FIGS. 6-8 depict three primary stages during the deployment of airbag module 200 and correspond with FIGS. 1-3 for airbag module 100. FIG. 6 illustrates airbag module 200 in a pre-deployment configuration. In this configuration, vent door 255 is open and secondary tether 240 is connected to engagement member 258. Cutter 120 has not yet been deployed in this configuration, nor has the airbag inflator (not shown).

FIG. 7 illustrates airbag module 200 in a first deployment configuration. In this configuration, gas flow 50 inflates airbag cushion 205. Primary tether 210 restrains airbag cushion 205 at a pre-configured inflation size, selected by the length of tether 210, such that airbag cushion 205 cannot fully inflate. Excess gas that would otherwise be used to fully inflate airbag cushion 205 can exit through opening 250 as indicated by arrows 60. In addition, secondary tether 240 has a length sufficient to allow it to remain connected with door 255 in this configuration.

FIG. 8 illustrates airbag module 200 in a full-deployment configuration. In this configuration, tether cutter 220 has been deployed to cut primary tether 210. As such, gas flow 50 is able to fully-inflate airbag cushion 205, which is no longer constrained by tether 210. Secondary tether 240 has also pulled sliding vent door 255 to a closed position to block gas flow from exiting vent opening 250. Of course, although vent door 255 is shown fully closed in the configuration of FIG. 8, other embodiments are contemplated in which a vent opening is only partially closed following a full-deployment sequence. Door stops 259 are provided to limit the sliding distance of vent door 255 within sliding rail 257. Once sliding vent door 255 has engaged door stops 259, further deployment force from inflation of airbag cushion 205 results in deformation of engagement member 258, thereby allowing the looped portion of secondary tether 240 to slide off of engagement member 258 and be pulled through opening 107 into airbag cushion 205.

Tethers 105 and 205 are each examples of means for restraining the inflation size of an airbag cushion. Tether cutters 120 and 220 are examples of means for releasing a means for restraining the inflation size of an airbag cushion. Vent doors 155 and 255 are examples of means for blocking at least one vent opening. Secondary tethers 140 and 240, in combination with engagement members 158 and 258, respectively, are examples of means for deploying the blocking means.

Without further elaboration, it is believed that one skilled in the art can use the preceding description to utilize the invention to its fullest extent. The examples and embodiments disclosed herein are to be construed as merely illustrative and not a limitation of the scope of the present invention in any way. It will be apparent to those having skill in the art that changes may be made to the details of the above-described embodiments without departing from the underlying principles of the invention. In other words, various modifications and improvements of the embodiments specifically disclosed in the description above are within the scope of the appended claims. The scope of the invention is therefore defined by the following claims. Note also that elements recited in means-plus-function format are intended to be construed in accordance with 35 U.S.C. §112 ¶6.

The invention claimed is:

1. A method for closing an airbag vent, the method comprising:
    inflating an airbag cushion, wherein a primary tether is connected with the airbag cushion at one end and is connected at another end to a device for restraining the inflation size of the airbag cushion and for optionally releasing the primary tether, and wherein a secondary tether is connected with the airbag cushion at one end and is connected at another end to a vent in an airbag module housing with a vent opening in an open position;
    releasing the primary tether to allow the airbag cushion to expand and cause the secondary tether to move from being slack while the primary tether was taut such the secondary tether also becomes taut;
    closing the vent opening through movement of the secondary tether after release of the primary tether so that the airbag cushion can fully expand; and
    releasing the secondary tether from engagement with the vent after the vent opening is closed so that the vent opening remains closed and the secondary tether does not restrict the airbag cushion from full expansion.

2. The method of claim 1, wherein the secondary tether is attached to the primary tether.

3. The method of claim 1, wherein the secondary tether is directly attached to the airbag cushion.

4. The method of claim 1, wherein the primary tether is released by actuating a tether cutter.

5. The method of claim 4, wherein the tether cutter comprises an initiator.

6. The method of claim 5, wherein the initiator is configured such that it provides an inherent seal to prevent the external release of pyrotechnic residues upon deployment.

7. The method of claim 6, wherein the initiator comprises a redrawn end that unrolls and expands during deployment.

8. The method of claim 1, wherein the step of closing the vent opening comprises pulling on a sliding vent door.

9. The method of claim 8, wherein the secondary tether is connected with an engagement member prior to releasing the primary tether.

10. The method of claim 9, wherein the secondary tether is released from the engagement member by bending the engagement member after the vent door has been slid to close the vent opening.

11. An airbag module, comprising:
    a housing comprising a slidable vent door positioned adjacent to a vent opening;
    an airbag cushion positioned within the housing;
    a primary tether connected with the airbag cushion at one end and connected at another end to a device for restraining the inflation size of the airbag cushion and for optionally releasing the primary tether; and
    a secondary tether connected with the airbag cushion at one end and retained at another end by an engagement member connected to the slideable vent door to slide the vent door and close the vent opening,
        wherein the vent opening is initially open to vent inflation gas upon deployment of the airbag cushion,
        wherein the secondary tether has a length, which permits the secondary tether to move and become sufficiently taut close the vent opening in response to the inflating airbag cushion following release of the primary tether so that the airbag cushion can fully expand, and which enables the secondary tether to be released from the engagement member after the vent opening is closed so that the vent opening remains closed and the secondary tether does not restrict the airbag cushion from fully expanding.

12. The airbag module of claim 11, wherein the engagement member comprises a hook.

13. The airbag module of claim 11, wherein the device comprises a tether cutter configured to cut the primary tether.

14. The airbag module of claim 13, wherein the tether cutter comprises an initiator.

15. The airbag module of claim 14, wherein the initiator is configured such that it provides an inherent seal to prevent the external release of pyrotechnic residues upon deployment.

16. The airbag module of claim 15, wherein the initiator comprises a redrawn end that unrolls and expands during deployment.

* * * * *